United States Patent
Czompo et al.

(10) Patent No.: US 9,250,083 B2
(45) Date of Patent: Feb. 2, 2016

(54) HEADING, VELOCITY, AND POSITION ESTIMATION WITH VEHICLE SENSORS, MOBILE DEVICE, AND GNSS INPUTS

(71) Applicant: QUALCOMM Incorporated, San Diego, CA (US)

(72) Inventors: Joseph Czompo, San Jose, CA (US); Benjamin A. Werner, Santa Clara, CA (US); Vesa Veikko Ruuska, Tampere (FI); William James Morrison, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/087,797

(22) Filed: Nov. 22, 2013

(65) Prior Publication Data
US 2014/0288825 A1     Sep. 25, 2014

Related U.S. Application Data

(60) Provisional application No. 61/804,490, filed on Mar. 22, 2013.

(51) Int. Cl.
| | |
|---|---|
| *G01C 21/16* | (2006.01) |
| *G01S 19/40* | (2010.01) |
| *G01S 19/49* | (2010.01) |
| *G01S 5/02* | (2010.01) |

(52) U.S. Cl.
CPC .............. *G01C 21/165* (2013.01); *G01S 5/0263* (2013.01); *G01S 19/40* (2013.01); *G01S 19/49* (2013.01)

(58) Field of Classification Search
CPC ...... G01C 21/00; G01C 21/165; G01S 19/40; G01S 19/49; G01S 5/0263
See application file for complete search history.

(56) References Cited

U.S. PATENT DOCUMENTS

| | | | |
|---|---|---|---|
| 6,975,959 | B2 | 12/2005 | Dietrich et al. |
| 7,957,897 | B2 | 6/2011 | Basnayake |
| 2010/0130229 | A1 | 5/2010 | Sridhara et al. |
| 2011/0313650 | A1 | 12/2011 | Tom |
| 2012/0173195 | A1 | 7/2012 | Opshaug et al. |
| 2012/0215442 | A1 | 8/2012 | Sambongi |
| 2012/0221244 | A1 | 8/2012 | Georgy et al. |

(Continued)

OTHER PUBLICATIONS

International Search Report and Written Opinion—PCT/US2014/031427—ISA/EPO—Jul. 29, 2014.

(Continued)

*Primary Examiner* — John Q Nguyen
*Assistant Examiner* — Michael Kerrigan
(74) *Attorney, Agent, or Firm* — Muncy, Geissler, Olds & Lowe, P.C.

(57) ABSTRACT

The disclosure generally relates to determining position of a motorized vehicle using wireless techniques. Methods, apparatus and systems are disclosed. A method can include: receiving absolute positioning data; receiving, from a mobile device, at least one of gyroscope data and odometry data; receiving, from a vehicle, at least one of gyroscope data and odometry data; initializing at least a heading to determine a relative path, wherein the relative path is based at least in part on the received data from the mobile device and the vehicle, wherein the received data comprises gyroscope data and odometry data; and shifting the relative path to an estimated path, wherein the estimated path is based at least in part on the absolute positioning data.

15 Claims, 7 Drawing Sheets

(56) References Cited

U.S. PATENT DOCUMENTS

2012/0245839 A1    9/2012   Syed et al.
2012/0309411 A1   12/2012   MacGougan et al.
2013/0297204 A1*  11/2013   Bartels ................ G01C 21/165
                                                         701/495

OTHER PUBLICATIONS

Niu X., et al., "Using inertial sensors of i Phone 4 for car navigation", Position Location and Navigation Symposium (PLANS), 2012 IEEE/ION, IEEE, Apr. 23, 2012, pp. 555-561, XP032200276, DOI: 10.1109/PLANS.2012.6236927 ISBN: 978-1-4673-0385-9 Section II, pp. 556-557.

Yuanxin W., et al., "Self-calibration for IMU/Odometer Land Navigation, Simulation and Test Results", ITM 2010—Proceedings of the 2010 International Technical Meeting of the Institute of Navigation, The Institute of Navigation, 8551 Rixlew Lane Suite 360 Manassas, VA 20109, USA, Jan. 27, 2010, pp. 839-849, XP056002173, Section 2-3, pp. 840-842.

* cited by examiner

HEADING, VELOCITY, AND POSITION ESTIMATION WITH VEHICLE SENSORS, MOBILE DEVICE, AND GNSS INPUTS

CROSS-REFERENCE TO RELATED APPLICATION

The present Application for Patent claims the benefit of U.S. Provisional Application 61/804,490, entitled "HEADING, VELOCITY, AND POSITION ESTIMATION WITH VEHICLE SENSORS, MOBILE DEVICE, AND GNSS INPUTS," filed Mar. 22, 2013, assigned to the assignee hereof, and expressly incorporated herein by reference in its entirety.

FIELD OF DISCLOSURE

Disclosed embodiments relate to estimating heading, velocity, and position of a motorized vehicle. More particularly, exemplary embodiments are directed to estimating heading, velocity, and position with vehicle sensors, mobile device, and GNSS inputs.

BACKGROUND

Mobile communications networks are in the process of offering increasingly sophisticated capabilities associated with the motion and/or position location sensing of a mobile device. New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as a 911 call in the United States.

Such motion and/or position determination capabilities have conventionally been provided using digital cellular positioning techniques and/or Satellite Positioning Systems (SPS). Additionally, with the increasing proliferation of miniaturized motion sensors (e.g., simple switches, accelerometers, angle sensors, etc), such on-board devices may be used to provide relative position, velocity, acceleration, and/or orientation information.

In conventional digital cellular networks, position location capability can be provided by various time and/or phase measurement techniques. For example, in CDMA networks, one position determination approach used is Advanced Forward Link Trilateration (AFLT). Using AFLT, a mobile device may compute its position from phase measurements of pilot signals transmitted from a plurality of base stations. Improvements to AFLT have been realized by utilizing hybrid position location techniques, where the mobile station may employ an SPS receiver that can provide position information independent of the information derived from the signals transmitted by the base stations. Moreover, position accuracy can be improved by combining measurements derived from both SPS and AFLT systems using conventional techniques.

In conventional digital cellular networks, position location capability can be provided by various time and/or phase measurement techniques. For example, in CDMA networks, one position determination approach used is Advanced Forward Link Trilateration (AFLT). Using AFLT, a mobile device may compute its position from phase measurements of pilot signals transmitted from a plurality of base stations. Improvements to AFLT have been realized by utilizing hybrid position location techniques, where the mobile station may employ an SPS receiver that can provide position information independent of the information derived from the signals transmitted by the base stations. Moreover, position accuracy can be improved by combining measurements derived from both SPS and AFLT systems using conventional techniques.

Furthermore, navigation devices often support popular and increasingly important SPS wireless technologies which may include, for example, the Global Positioning System (GPS) and/or a Global Navigation Satellite System (GNSS). Navigation devices supporting SPS may obtain navigation signals as wireless transmissions received from one or more transmitter equipped satellites that may be used to estimate geographic position and heading. Some navigation devices may additionally or alternatively obtain navigation signals as wireless transmissions received from terrestrial based transmitters to estimate geographic position and heading and/or include one or more inertial sensors (e.g., accelerometers, gyroscopes, etc.) that reside on-board the navigation device to measure an inertial state of the navigation device. Inertial measurements obtained from these inertial sensors may be used in combination with or independent of navigation signals received from satellite and/or terrestrial based transmitters to provide estimates of geographic position and heading.

Several issues arise when combining a GNSS navigation system with sensor based navigation in a vehicle. One such issue lies with the importance of heading in the navigation filter. With a vehicle model, vehicle heading must be initialized and maintained to receive the full benefit of the sensors. Heading initialization can be difficult in low speed and/or bad GNSS environments.

After a heading is initialized, a gyroscope device that is sensitive in the vertical direction and odometry are the sensors available for dead reckoning on the vehicle. This allows for dead reckoning by assuming the vehicle roll and pitch are both close to zero (i.e., dead reckoning in a two-dimensional sense). Given that GNSS data and reality contain a vertical dimension to estimate, there exists a necessity to account for this in the navigation system.

A second concern during navigation is the lever arm between the odometry in the vehicle and the GNSS receiver present on the mobile device. The effect of an unknown lever arm is seen when the vehicle is executing a turn. Treating the receiver data as if there is no lever arm in this case leads to carrier phase based pseudo-range rates to significantly disagree with velocity based on dead reckoning. This unknown quantity must be accounted for when dead reckoning so as to allow GNSS measurements to agree.

SUMMARY

Exemplary embodiments of the invention are directed to systems and methods for estimating heading, velocity, and position with vehicle sensors, mobile device, and GNSS inputs.

For example, an exemplary embodiment is directed to a method for estimating heading, velocity, and position with vehicle sensors, mobile device, and GNSS inputs, a method comprising: receiving absolute positioning data; receiving, from a mobile device, at least one of gyroscope data and odometry data; receiving, from a vehicle, at least one of gyroscope data and odometry data; initializing at least a heading to determine a relative path, wherein the relative path is based at least in part on the received data from the mobile device and the vehicle, wherein the received data comprises gyroscope data and odometry data; and shifting the relative path to an estimated path, wherein the estimated path is based at least in part on the absolute positioning data.

Another exemplary embodiment is directed to an apparatus estimating heading, velocity, and position with vehicle sensors, mobile device, and GNSS inputs, the apparatus comprising: an position/motion data module configured to receive absolute positioning data; a wireless-based positioning module configured to receive, from a mobile device, at least one of gyroscope data and odometry data; a vehicle data sensor configured to receive, from a vehicle, at least one of gyroscope data and odometry data; an application module configured to initialize at least a heading to determine a relative path, wherein the relative path is based at least in part on the received data from the mobile device and the vehicle, wherein the received data comprises gyroscope data and odometry data; and a positioning module configured to shift the relative path to an estimated path, wherein the estimated path is based at least in part on the absolute positioning data.

Another exemplary embodiment is directed to an apparatus estimating heading, velocity, and position with vehicle sensors, mobile device, and GNSS inputs, the apparatus comprising: means for receiving absolute positioning data; means for receiving, from a mobile device, at least one of gyroscope data and odometry data; means for receiving, from a vehicle, at least one of gyroscope data and odometry data; means for initializing at least a heading to determine a relative path, wherein the relative path is based at least in part on the received data from the mobile device and the vehicle, wherein the received data comprises gyroscope data and odometry data; and means for shifting the relative path to an estimated path, wherein the estimated path is based at least in part on the absolute positioning data.

Still another exemplary embodiment is directed to a non-transitory computer-readable storage medium having computer-executable instructions recorded thereon, wherein executing the computer-executable instructions on an apparatus for determining position of a vehicle using wireless techniques, the non-transitory computer-readable storage medium comprising: code for receiving absolute positioning data; code for receiving, from a mobile device, at least one of gyroscope data and odometry data; code for receiving, from a vehicle, at least one of gyroscope data and odometry data; code for initializing at least a heading to determine a relative path, wherein the relative path is based at least in part on the received data from the mobile device and the vehicle, wherein the received data comprises gyroscope data and odometry data; and code for shifting the relative path to an estimated path, wherein the estimated path is based at least in part on the absolute positioning data.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
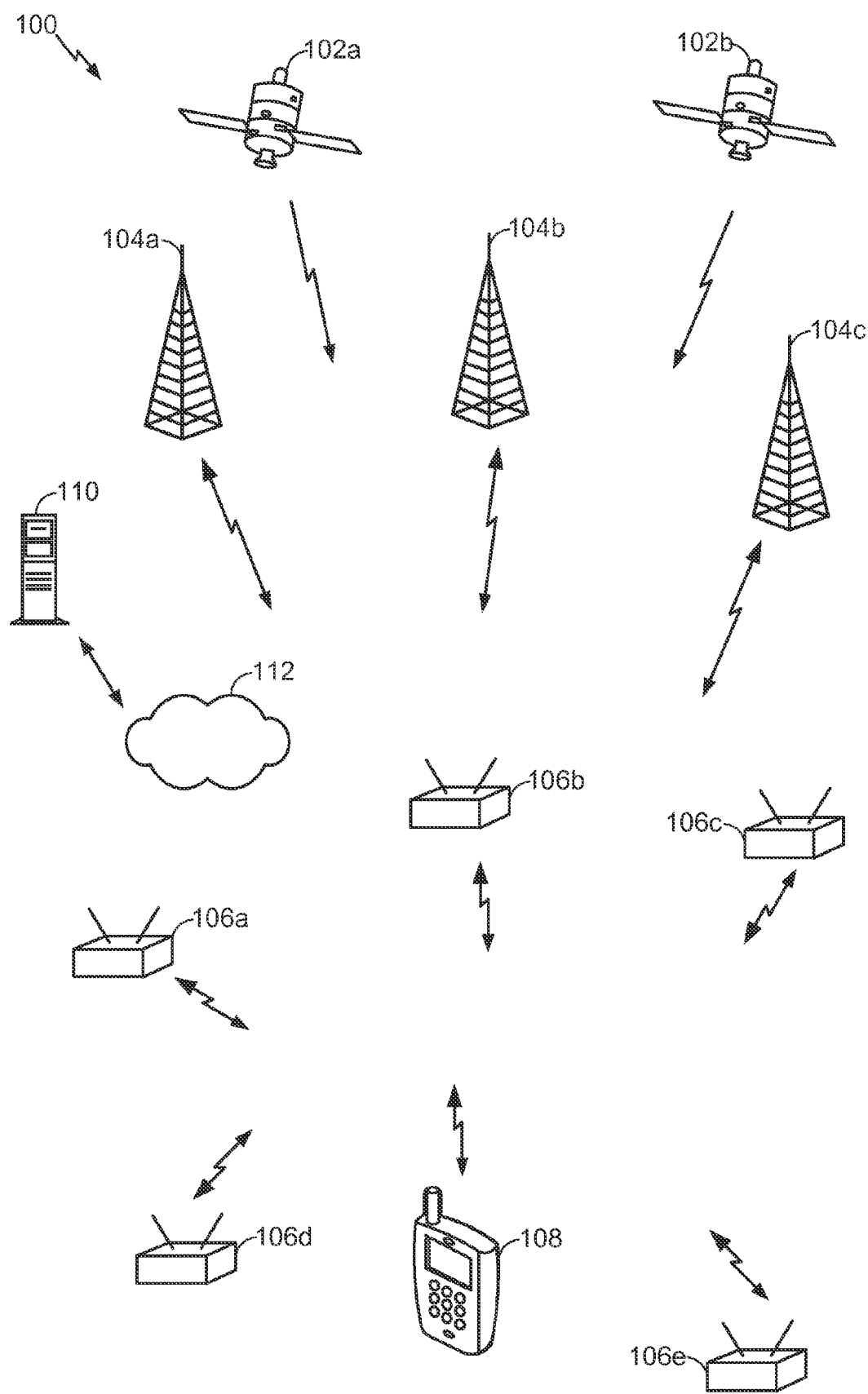
FIG. 1 illustrates an exemplary operating environment for a mobile station that can determine position using wireless techniques, according to one aspect of the disclosure.

According to one aspect of the disclosure, FIG. 1 illustrates an exemplary operating environment 100 for a mobile station 108 having wireless positioning capability. Embodiments are directed to a mobile station 108 which may determine its position based upon round trip time (RTT) measurements that are adjusted to accommodate for processing delays introduced by wireless access points. The processing delays may vary among different access points and may also change over time. By using information from a motion sensor, the mobile station 108 may calibrate out the effects of the processing delays introduced by the wireless access points.

The operating environment 100 may contain one or more different types of wireless communication systems and/or wireless positioning systems. In the embodiment shown in FIG. 1, a Satellite Positioning System (SPS) 102 may be used as an independent source of position information for the mobile station 108. The mobile station 108 may include one or more dedicated SPS receivers specifically designed to receive signals for deriving geo-location information from the SPS satellites.

The operating environment 100 may also include one or more Wide Area Network Wireless Access Points (WAN-WAPs) 104, which may be used for wireless voice and/or data communication, and as another source of independent position information for the mobile station 108. The WAN-WAPs 104 may be part of a wide area wireless network (WWAN), which may include cellular base stations at known locations, and/or other wide area wireless systems, such as, for example, WiMAX (e.g., 802.16). The WWAN may include other known network components which are not shown in FIG. 1 for simplicity. Typically, each of the WAN-WAPs 104a-104c within the WWAN may operate from fixed positions, and provide network coverage over large metropolitan and/or regional areas.

The operating environment 100 may further include one or more Local Area Network Wireless Access Points (LAN-WAPs) 106, which may be used for wireless voice and/or data communication, as well as another independent source of position data. The LAN-WAPs can be part of a Wireless Local Area Network (WLAN), which may operate in buildings and perform communications over smaller geographic regions than a WWAN. Such LAN-WAPs 106 may be part of, for example, WLAN networks (802.11x), cellular piconets and/or femtocells, Bluetooth Networks, etc.

The mobile station 108 may derive position information from any one or more of the SPS satellites 102, the WAN-WAPs 104, and/or the LAN-WAPs 106. Each of the aforementioned systems can provide an independent estimate of the position for the mobile station 108 using different techniques. In some embodiments, the mobile station 108 may combine the solutions derived from each of the different types of access points to improve the accuracy of the position data. When deriving position using the SPS 102, the mobile station 108 may utilize a receiver specifically designed for use with the SPS that extracts position, using conventional techniques, from a plurality of signals transmitted by SPS satellites 102.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104c may take the form of base stations within a digital cellular network, and the mobile station 108 may include a cellular transceiver and processor that can exploit the base station signals to derive position. Such cellular networks may include, but are not limited to, standards in accordance with GSM, CMDA, 2G, 3G, 4G, LTE, etc. It should be understood that digital cellular network may include additional base stations or other resources that may not be shown in FIG. 1. While WAN-WAPs 104 may actually be moveable or otherwise capable of being relocated, for illustration purposes it will be assumed that they are essentially arranged in a fixed position.

The mobile station 108 may perform position determination using known time-of-arrival (TOA) techniques such as, for example, Advanced Forward Link Trilateration (AFLT). In other embodiments, each WAN-WAP 104a-104c may comprise a Worldwide Interoperability for Microwave Access (WiMAX) wireless networking base station. In this case, the mobile station 108 may determine its position using TOA techniques from signals provided by the WAN-WAPs 104. The mobile station 108 may determine positions either in a stand-alone mode, or using the assistance of a positioning server 110 and network 112 using TOA techniques, as will be described in more detail below. Furthermore, various embodiments may have the mobile station 108 determine position information using WAN-WAPs 104, which may have different types. For example, some WAN-WAPs 104 may be cellular base stations, and other WAN-WAPs 104 may be WiMAX base stations. In such an operating environment, the mobile station 108 may be able to exploit the signals from each different type of WAN-WAP 104, and further combine the derived position solutions to improve accuracy.

When deriving position using the WLAN, the mobile station 108 may utilize time of arrival techniques with the assistance of the positioning server 110 and the network 112. The positioning server 110 may communicate to the mobile station 108 through network 112. Network 112 may include a combination of wired and wireless networks which incorporate the LAN-WAPs 106. In one embodiment, each LAN-WAP 106a-106e may be, for example, a WLAN wireless access point, which is not necessarily set in a fixed position and can change location. The position of each LAN-WAP 106a-106e may be stored in the positioning server 110 in a common coordinate system. In one embodiment, the position of the mobile station 108 may be determined by having the mobile station 108 receive signals from each LAN-WAP 106a-106e. Each signal may be associated with its originating LAN-WAP based upon some form of identifying information that may be included in the received signal (such as, for example, a MAC address). The mobile station 108 may then sort the received signals based upon signal strength, and derive the time delays associated with each of the sorted received signals. The mobile station 108 may then form a message which can include the time delays and the identifying information of each of the LAN-WAPs, and send the message via network 112 to the positioning sever 110. Based upon the received message, the positioning server may then determine a position, using the stored locations of the relevant LAN-WAPs 106, of the mobile station 108. The positioning server 110 may generate and provide a Location Configuration Indication (LCI) message to the mobile station 108 that includes a pointer to the position of the mobile station 108 in a local coordinate system. The LCI message may also include other points of interest in relation to the location of the mobile station 108. When computing the position of the mobile station 108, the positioning server may take into account the different delays which can be introduced by elements within the wireless network.

The position determination techniques described herein may be used for various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) and so on. A CDMA network may implement one or more radio access technologies (RATs) such as cdma2000, Wideband-CDMA (W-CDMA), and so on. cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Figure 2:
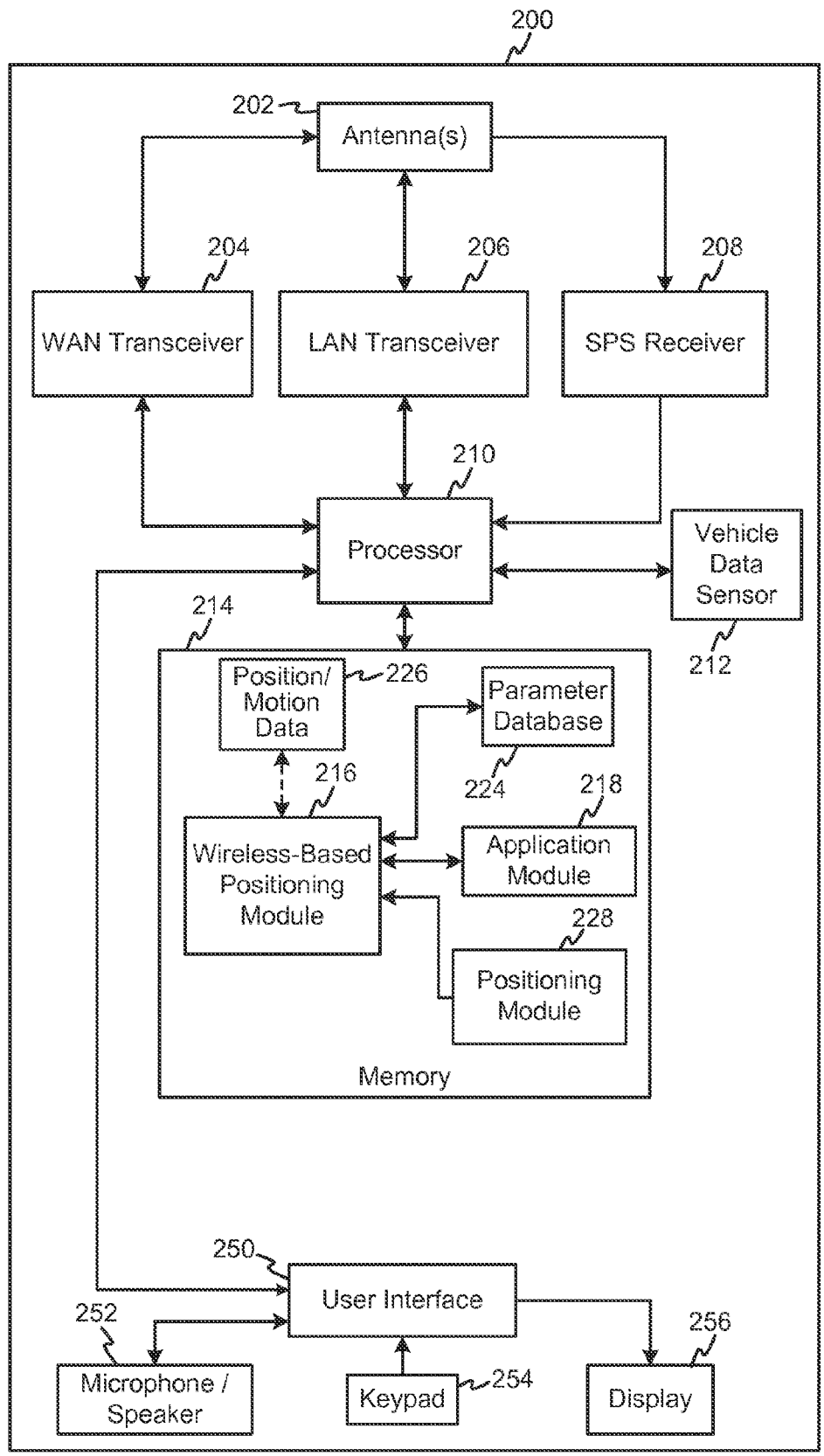
FIG. 2 illustrates an exemplary mobile station that may be used in an operating environment that can determine position using wireless techniques, according to one aspect of the disclosure.

FIG. 2 is a block diagram illustrating various components of an exemplary mobile station 200. For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The mobile station 200 may include one or more wide area network (WAN) transceiver(s) 204 that may be connected to one or more antennas 202. The WAN transceiver 204 comprises suitable devices, hardware, and/or software for communicating with and/or detecting signals to/from WAN-WAPs 104, and/or directly with other wireless devices within a network. In one aspect, the WAN transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (802.16), etc. The mobile station 200 may also include one or more local area network (LAN) transceivers 206 that may be connected to one or more antennas 202. The LAN transceiver 206 comprises suitable devices, hardware, and/or software for communicating with and/or detecting signals to/from LAN-WAPs 106, and/or directly with other wireless devices within a network. In one aspect, the LAN transceiver 206 may comprise a WLAN (802.11x) communication system suitable for communicating with one or more wireless access points; however in other aspects, the LAN transceiver 206 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to LAN-WAPs 106 and/or WAN-WAPs 104. Specifically, in the description presented below, when the term "WAP" is used, it should be understood that embodiments may include a mobile station 200 that can exploit signals from a plurality of LAN-WAPs 106, a plurality of WAN-WAPs 104, or any combination of the two. The specific type of WAP being utilized by the mobile station 200 may depend upon the environment of operation. Moreover, the mobile station 200 may dynamically select between the various types of WAPs in order to arrive at an accurate position solution. In other embodiments, various network elements may operate in a peer-to-peer manner, whereby, for example, the mobile station 200 may be replaced with the WAP, or vice versa. Other peer-to-peer embodiments may include another mobile station (not shown) acting in place of one or more WAP.

An SPS receiver 208 may also be included in the mobile station 200. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the mobile station's 200 position using measurements obtained by any suitable SPS algorithm.

A vehicle data sensor 212 may be coupled to a processor 210 to provide movement and/or orientation information which is independent of motion data derived from signals received by the WAN transceiver 204, the LAN transceiver 206 and the SPS receiver 208.

By way of example, the vehicle data sensor 212 may utilize an accelerometer (e.g., a MEMS device), a gyroscope, a geo-magnetic sensor (e.g., a compass), an altimeter (e.g., a barometric pressure altimeter), and/or any other type of movement detection sensor. Moreover, the vehicle data sensor 212 may include a plurality of different types of devices and combine their outputs in order to provide motion information. For example, the vehicle data sensor 212 may use a combination of a multi-axis accelerometer and orientation sensors to provide the ability to compute positions in 2-D and/or 3-D coordinate systems.

The processor 210 may be connected to the WAN transceiver 204, LAN transceiver 206, the SPS receiver 208 and the vehicle data sensor 212. The processor 210 may include one or more microprocessors, microcontrollers, and/or digital signal processors that provide processing functions, as well as other calculation and control functionality. The processor 210 may also include memory 214 for storing data and software instructions for executing programmed functionality within the mobile station 200. The memory 214 may be on-board the processor 210 (e.g., within the same IC package), and/or the memory may be external memory to the processor and functionally coupled over a data bus. The functional details associated with aspects of the disclosure will be discussed in more detail below.

A number of software modules and data tables may reside in memory 214 and be utilized by the processor 210 in order to manage both communications and positioning determination functionality. As illustrated in FIG. 2, memory 214 may include and/or otherwise receive a wireless-based positioning module 216, an application module 218, and a positioning module 228. One should appreciate that the organization of the memory contents as shown in FIG. 2 is merely exemplary, and as such the functionality of the modules and/or data structures may be combined, separated, and/or be structured in different ways depending upon the implementation of the mobile station 200.

The application module 218 may be a process running on the processor 210 of the mobile device 200, which requests position information from the wireless-based positioning module 216. Applications typically run within an upper layer of the software architectures, and may include Indoor Navigation, Buddy Locator, Shopping and Coupons, Asset Tracking, and location Aware Service Discovery. The wireless-based positioning module 216 may derive the position of the mobile device 200 using information derived from time information measured from signals exchanged with a plurality of WAPs. In order to accurately determine position using time-based techniques, reasonable estimates of time delays, introduced by the processing time of each WAP, may be used to calibrate/adjust the time measurements obtained from the signals. As used herein, these time delays are referred to as "processing delays."

Calibration to further refine the processing delays of the WAPs may be performed using information obtained by the vehicle data sensor 212. In one embodiment, the vehicle data sensor 212 may directly provide position and/or orientation data to the processor 210, which may be stored in memory 214 in the position/motion data module 226. In other embodiments, the vehicle data sensor 212 may provide data which should be further processed by processor 210 to derive information to perform the calibration. For example, the vehicle data sensor 212 may provide acceleration and/or orientation data (single or multi-axis) which can be processed using positioning module 228 to derive position data for adjusting the processing delays in the wireless-based positioning module 216. Thus, in some embodiments, the positioning module 228 can shift a relative path to an estimated path.

After calibration, the position may then be output to the application module 218 in response to its aforementioned request. In addition, the wireless-based positioning module 216 may utilize a parameter database 224 for exchanging operational parameters. Such parameters may include the determined processing delays for each WAP, the WAPs positions in a common coordinate frame, various parameters associated with the network, initial processing delay estimates, etc.

In other embodiments, the additional information may optionally include auxiliary position and/or motion data which may be determined from other sources besides the vehicle data sensor 212, such as, for example, from SPS measurements. The auxiliary position data may be intermittent and/or noisy, but may be useful as another source of independent information for estimating the processing delays of the WAPs depending upon the environment in which the mobile station 200 is operating.

For example, in some embodiments, data derived from the SPS receiver 208 may supplement the position data supplied by the vehicle data sensor 212 (either directly from the position/motion data module 226, wherein the position/motion data module 226 can receive absolute positioning data, or derived by the positioning module 228). In other embodiments, the position data may be combined with data determined through additional networks using non-RTT techniques (e.g., AFLT within a CDMA network). In certain implementations, the vehicle data sensor 212 and/or the SPS receiver 208 may provide all or part of the auxiliary position/motion data 226 without further processing by the processor 210. In some embodiments, the auxiliary position/motion data 226 may be directly provided by the vehicle data sensor 212 and/or the SPS receiver 208 to the processor 210.

While the modules shown in FIG. 2 are illustrated in the example as being contained in the memory 214, it is recognized that in certain implementations such procedures may be provided for or otherwise operatively arranged using other or additional mechanisms. For example, all or part of the wireless-based positioning module 216 and/or the application module 218 may be provided in firmware. Additionally, while in this example the wireless-based positioning module 216 and the application module 218 are illustrated as being separate features, it is recognized, for example, that such procedures may be combined together as one procedure or perhaps with other procedures, or otherwise further divided into a plurality of sub-procedures.

The processor 210 may include any form of logic suitable for performing at least the techniques provided herein. For example, the processor 210 may be operatively configurable based on instructions in the memory 214 to selectively initiate one or more routines that exploit motion data for use in other portions of the mobile device.

The mobile station 200 may include a user interface 250 which provides any suitable interface systems, such as a microphone/speaker 252, keypad 254, and display 256 that allows user interaction with the mobile station 200. The microphone/speaker 252 provides for voice communication services using the WAN transceiver 204 and/or the LAN transceiver 206. The keypad 254 comprises any suitable buttons for user input. The display 256 comprises any suitable display, such as, for example, a backlit LCD display, and may further include a touch screen display for additional user input modes.

As used herein, the mobile station 108 and/or mobile station 200 may be any portable or movable device or machine that is configurable to acquire wireless signals transmitted from, and transmit wireless signals to, one or more wireless communication devices or networks. As shown in FIG. 1 and FIG. 2, the mobile station 108 and/or mobile station 200 is representative of such a portable wireless device. Thus, by way of example but not limitation, the mobile station 108 may include a radio device, a cellular telephone device, a computing device, a personal communication system (PCS) device, or other like movable wireless communication equipped device, appliance, or machine. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless devices, computers, laptops, etc. which are capable of communication with a server, such as via the Internet, WLAN, or other network, and regardless of whether satellite signal reception, assistance data reception, and/or position-related processing occurs at the device, at a server, or at another device associated with the network. Any operable combination of the above is also considered a "mobile station."

As used herein, the term "wireless device" may refer to any type of wireless communication device which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

Figure 3:
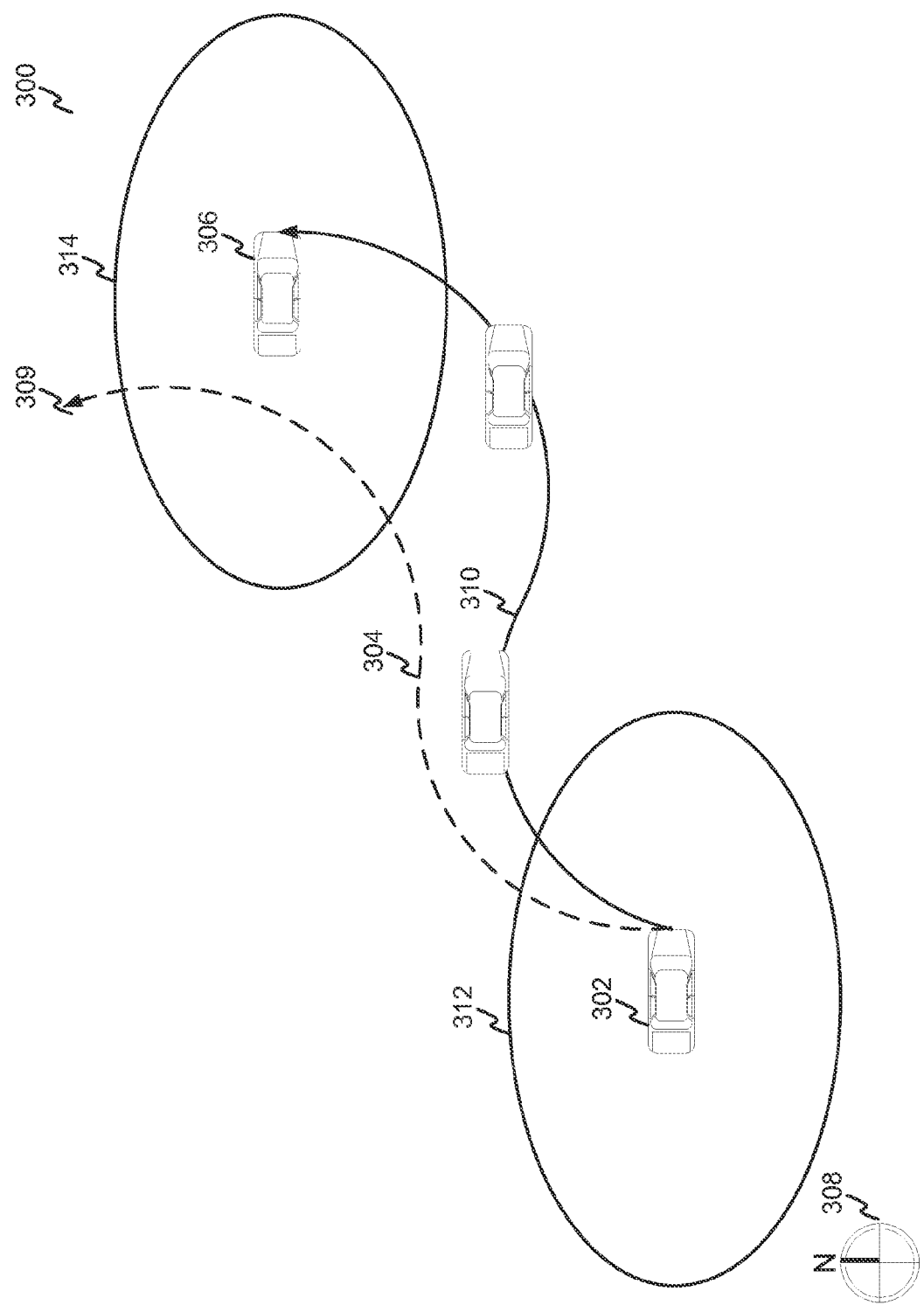
FIG. 3 illustrates an exemplary path of a vehicle wherein the devices within the vehicle can estimate the heading, velocity, and position with vehicle sensors, mobile device, and GNSS inputs.

FIG. 3 illustrates an exemplary estimation 300 of a vehicle wherein the devices within the vehicle can estimate the heading, velocity, and position with vehicle sensors, a mobile device, and GNSS inputs. The vehicle begins at starting point 302 and finishes at ending point 306. When the ending point 306 is statistically separated from the starting point 302, the heading can be initialized using the vehicle sensor's ability to dead reckon and determine a relative path 304. Having stored odometry and gyroscope data between the two points 302, 306, an initial heading can be calculated by observing a sufficiently well known velocity, and assuming the vehicle is pointed in that direction. As shown, however, the ending point 306 of the vehicle may not be determined using only the relative path 304.

In using odometry and gyroscope data to determine the relative path 304, a reference direction 308 can be used. As shown on FIG. 3, the reference direction 308 can be north. Using absolute positioning data, such as GNSS data, the relative path 304 can receive data to shift the relative path 304 to the estimated path 310. After having done so, the dead reckoning will have a heading for the ending point 306 that can be used for normal filtering operation.

In some embodiments, the location of the vehicle can have a margin of error. For example, in FIG. 3, the starting point 302 has a starting area 312 and the ending point 306 has an ending area 314. If the vehicle is moving slowly or in an environment with bad GNSS, the heading can only become apparent after sufficient movement.

Figure 4:
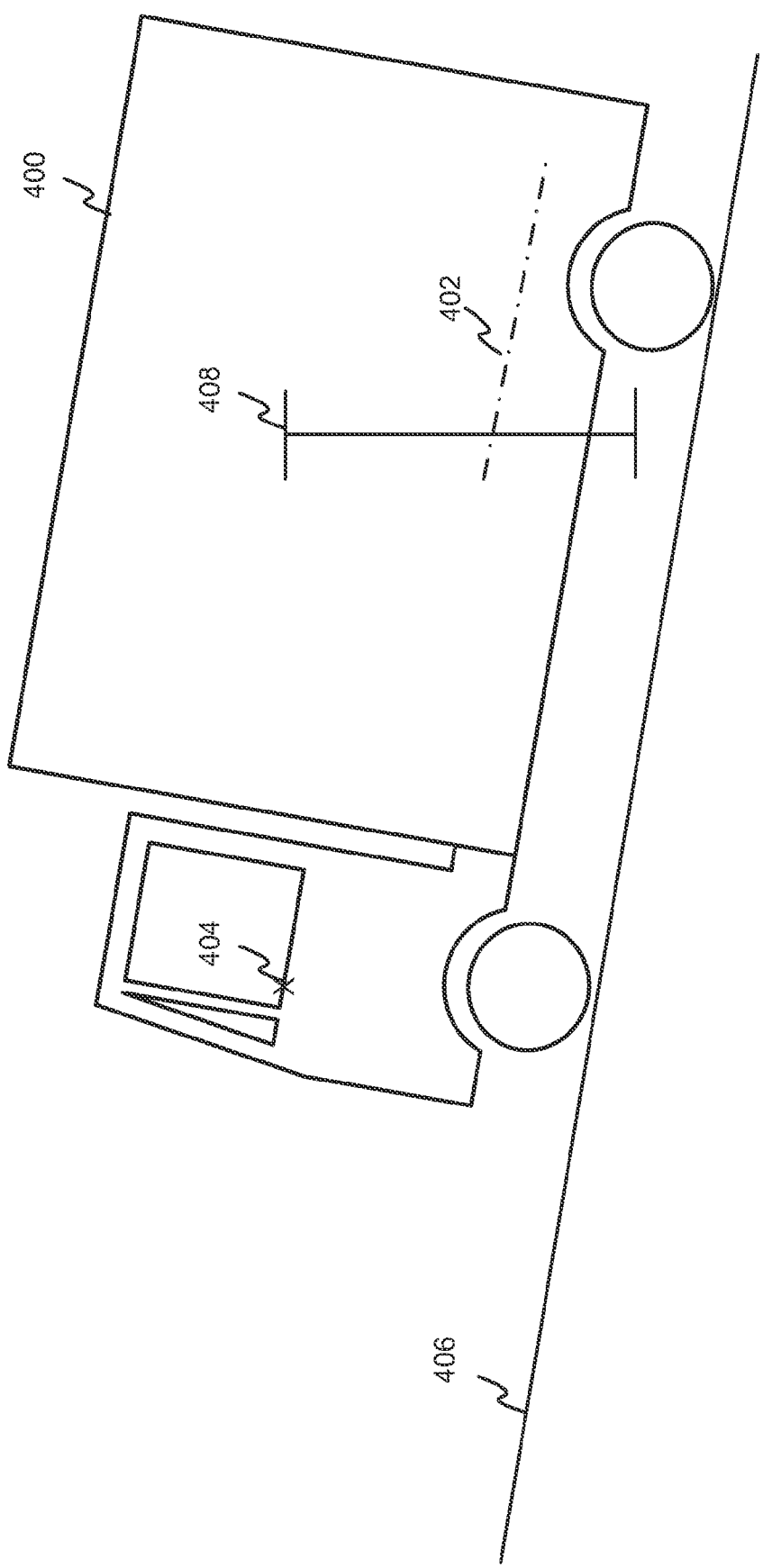
FIG. 4 illustrates an exemplary system for estimating the heading, velocity, and position with vehicle sensors, mobile device, and GNSS inputs.

FIG. 4 illustrates an exemplary system for estimating the heading, velocity, and position with vehicle sensors, a mobile device, and GNSS inputs. In FIG. 4, a motorized vehicle 400 comprises an odometry device 402 and a gyroscopic device, such as a GNSS receiver 404, which are not collocated. For example, the GNSS receiver 404 can be a mobile phone, which can be located at the front of the passenger area of the car.

In some embodiments, the motorized vehicle 400 can be traveling on road 406 such that the motorized vehicle 400 has a non-zero pitch and roll. Therefore, there can be a height difference 408 between the GNSS receiver 404 and the odometry device 402. After initialization, in order to use dead reckoning functionality, the position is propagated in flat local coordinates. The odometry device 402 may assume that propagation is in the horizontal plane. Gyroscope data, however, may not be pointing upwards and can require an assumed maximum scale factor on the gyroscope data. Therefore, the scale factor on the odometry must be allowed to vary due changes in pitch.

This is accomplished by updating the heading with the one dimensional gyroscope data and moving the position by the position increment indicated by odometry data. Instead of tracking pitch and roll estimates, the error model leaves room for the possibility of non-zero pitch and roll.

Figure 5:
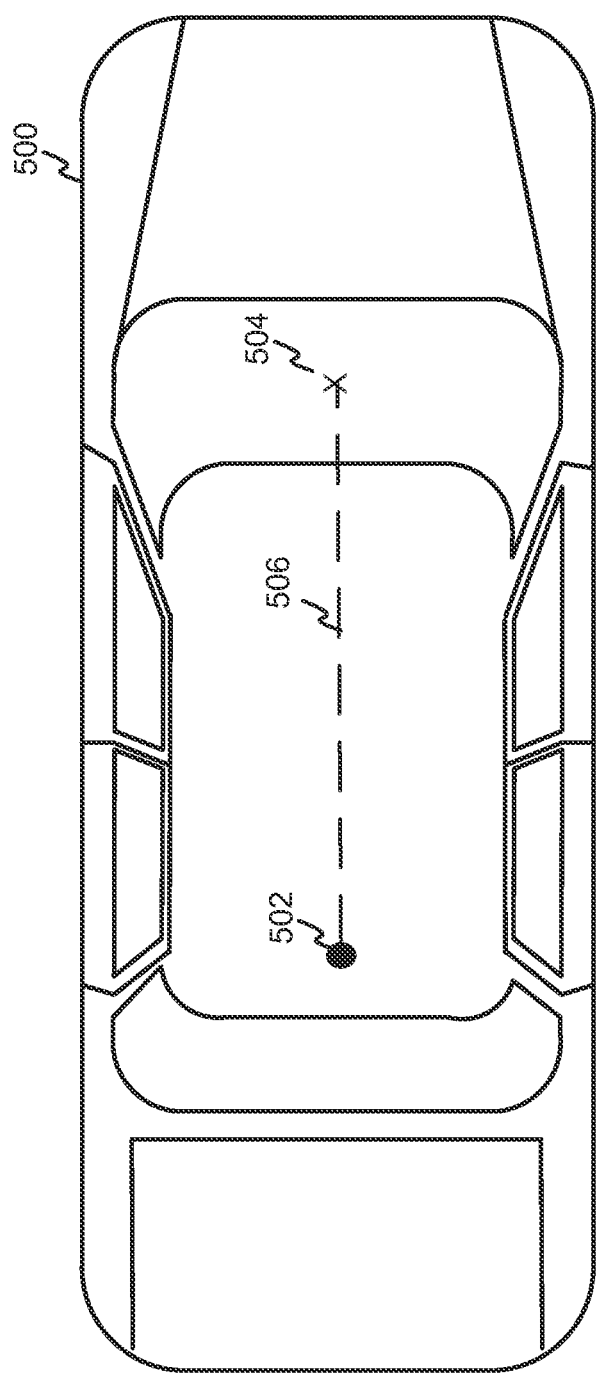
FIG. 5 illustrates another exemplary system for estimating the heading, velocity, and position with vehicle sensors, mobile device, and GNSS inputs.

FIG. 5 illustrates another exemplary system for estimating the heading, velocity, and position with vehicle sensors, a mobile device, and GNSS inputs. In FIG. 5, a motorized vehicle 500 includes components for estimating the heading, velocity, and position with vehicle sensors, mobile device, and GNSS inputs. In some embodiments, an odometry device 502 and a GNSS receiver 504 (i.e., a device that provides both gyroscope data and relative position data) may not be collocated. For example, the GNSS receiver 504 can be a mobile phone, which can be located at the front of the passenger area of the car. To incorporate the difference in positioning, a lever arm value for the lever arm 506 can be determined. In some embodiments, a zero-based large uncertainty can be used. In other embodiments, for example, the displacement from the odometry device 502 can be measured to the GNSS receiver 504 to determine the lever arm value. In another embodiment, an assumption of a lever arm 506 can be made.

The length of the lever arm 506 can be assumed to be two meters. Other values can also be considered. When propagating the navigation solution using odometry data, a cross track velocity (and position change) can be calculated based on the rotation rate. The uncertainty of the cross track velocity can be based on the lever arm uncertainty and gyroscopic noise characteristics. After the cross track velocity is calculated, it can be incorporated into the position propagation and the non-holonomic constraint on velocity.

Figure 6:
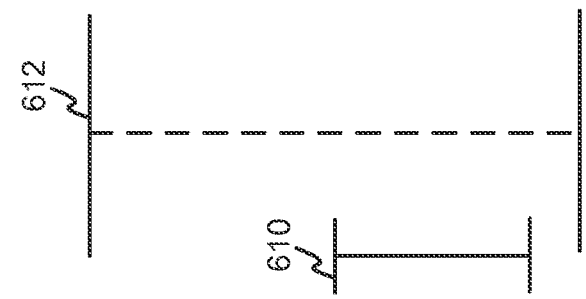
FIG. 6 illustrates an exemplary system for estimating the heading, velocity, and position with vehicle sensors, a mobile device, and GNSS inputs.
Figure 6:
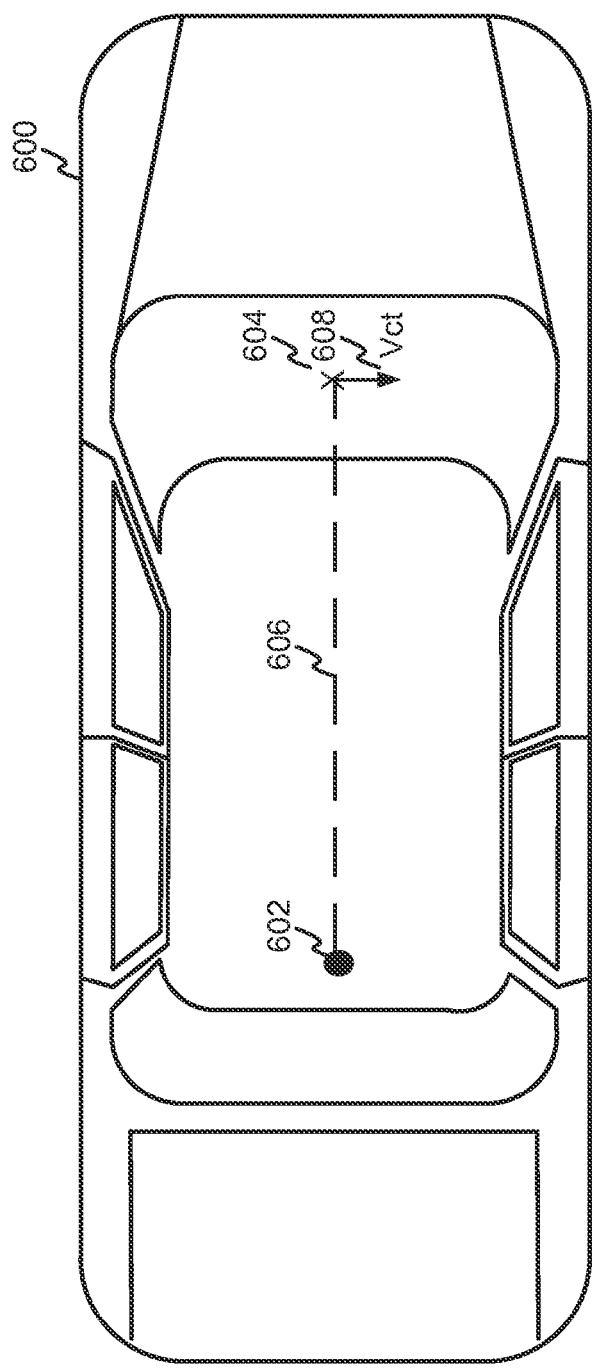

FIG. 6 illustrates an exemplary system for estimating the heading, velocity, and position with vehicle sensors, a mobile device, and GNSS inputs. In FIG. 6, a motorized vehicle 600 includes an odometry device 602, a GNSS receiver 604, a lever arm 606, a crosstrack velocity component (Vct) 608, and Vct uncertainty 610. In some embodiments, Vct can be estimated. For example, Vct can be involved in the non-holonomic constraint calculation and the Vct uncertainty 610. In another embodiment, Vct may not be estimated while overall uncertainty 612 may be estimated. For example, the overall uncertainty 612 can be calculated from the possible value for Vct and the Vct uncertainty 610. In this case, the uncertainty of the non-holonomic constraint can be the overall uncertainty 612.

Figure 7:
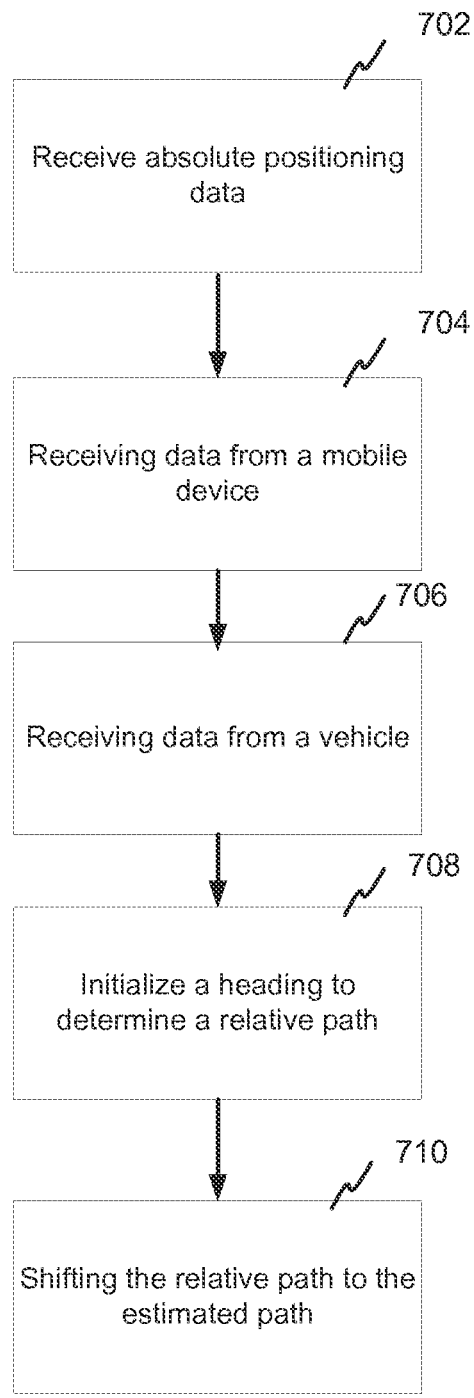
FIG. 7 illustrates an operational flow of a method for determine position using wireless techniques according to exemplary embodiments.

It will be appreciated that embodiments include various methods for performing the processes, functions, and/or algorithms disclosed herein. For example, as illustrated in FIG. 7, an embodiment can include a method of determining position of a motorized vehicle using wireless techniques, comprising: receiving absolute positioning data—Block 702; receiving, from a mobile device, at least one of gyroscope data and odometry data—Block 704; receiving, from a vehicle, at least one of gyroscope data and odometry data—Block 706; initializing at least a heading to determine a relative path, wherein the relative path is based at least in part on the received data from the mobile device and the vehicle, wherein the received data comprises gyroscope data (e.g., data retrieved from a GNSS device 404) and odometry data (e.g., data retrieved from a rear-wheel transmission)—Block 708; and shifting the relative path to the estimated path, wherein the estimated path is based at least in part on the absolute positioning data (e.g., using a GNSS device 404)—Block 704.

In some embodiments, the estimated path can include a margin of error to account for absolute positioning data. For example, data from a GNSS receiver 504 as shown in FIG. 5 may not provide accurate information. A margin of error allows for this problem. The motorized vehicle may not be on a horizontal plane. Therefore, it may be helpful to factor in an assumed maximum scale factor to the gyroscope data and a scale factor with variation to the odometry data.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an electronic object. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for determining an actual heading of a vehicle using a mobile device located within the vehicle, the method comprising:
    determining, at the mobile device, a relative path based on odometry data and gyroscope data, wherein the odometry data is received from the vehicle and the gyroscope data is from at least one of the vehicle and the mobile device, the relative path including an initial heading;
    determining, at the mobile device, an estimated path based on absolute positioning data from at least one of the mobile device and the vehicle;
    shifting, at the mobile device, the relative path including the initial heading to the estimated path, the shifted initial heading indicating the actual heading of the vehicle; and
    performing dead reckoning based on the actual heading of the vehicle and based on a lever arm value representing a difference in location of the mobile device and an odometry device on the vehicle.

2. The method of claim 1 wherein performing dead reckoning comprises performing dead reckoning further based on an assumed maximum scale factor for the gyroscope data.

3. The method of claim 2, wherein performing dead reckoning comprises performing dead reckoning further based on a scale factor with variation for the odometry data.

4. The method of claim 1, wherein performing dead reckoning comprises performing dead reckoning using the actual heading to determine an actual path of the vehicle.

5. The method of claim 1, wherein the lever arm value is an assumed value.

6. The method of claim 1, wherein performing dead reckoning comprises performing dead reckoning further based on gyroscope data from a gyroscope with a vertical sensitive axis.

7. The method of claim 1, wherein performing dead reckoning comprises performing dead reckoning further based on gyroscope data from more than one gyroscope and at least one gyroscope measures pitch.

8. The method of claim 7, wherein a second gyroscope of the more than one gyroscope measures roll.

9. An apparatus for use in a mobile device for determining an actual heading of a vehicle when the mobile device is located within the vehicle, the apparatus comprising:
an application module configured to determine a relative path based on odometry data and gyroscope data, wherein the odometry data is received from the vehicle and the gyroscope data is from at least one of the vehicle and the mobile device, the relative path including an initial heading; and
a positioning module configured to determine an estimated path based on absolute positioning data from at least one of the mobile device and the vehicle, and to shift the relative path, including the initial heading, to the estimated path, wherein the shifted initial heading indicates the actual heading of the vehicle, wherein the positioning module is further configured to perform dead reckoning based on the actual heading of the vehicle and based on a lever arm value representing a difference in location of the mobile device and an odometry device on the vehicle.

10. The apparatus of claim 9, wherein the positioning module is further configured to perform dead reckoning further based on an assumed maximum scale factor for the gyroscope data.

11. The apparatus of claim 10, wherein the positioning module is further configured to perform dead reckoning further based on a scale factor with variation for the odometry data.

12. The apparatus of claim 9, wherein the positioning module is further configured to perform dead reckoning using the actual heading to determine an actual path of the vehicle.

13. The apparatus of claim 9, wherein the lever arm value is an assumed value.

14. A non-transitory computer-readable storage medium having computer-executable instructions recorded thereon, wherein executing the computer-executable instructions on an apparatus for determining an actual heading of a vehicle using a mobile device located within the vehicle, the non-transitory computer-readable storage medium comprising:
code for determining, at the mobile device, a relative path based on odometry data and gyroscope data, wherein the odometry data is received from the vehicle and the gyroscope data is from at least one of the vehicle and the mobile device, the relative path including an initial heading;
code for determining, at the mobile device, an estimated path based on absolute positioning data from at least one of the mobile device and the vehicle;
code for shifting, at the mobile device, the relative path including the initial heading to the estimated path, the shifted initial heading indicating the actual heading of the vehicle; and
code for performing, at the mobile device, dead reckoning based on the actual heading of the vehicle and based on a lever arm value representing a difference in location of the mobile device and an odometry device on the vehicle.

15. An apparatus for use in a mobile device for determining an actual heading of a vehicle using the mobile device located within the vehicle, the apparatus comprising:
means for determining, at the mobile device, a relative path based on odometry data and gyroscope data, wherein the odometry data is received from the vehicle and the gyroscope data is from at least one of the vehicle and the mobile device, the relative path including an initial heading;
means for determining, at the mobile device, an estimated path based on absolute positioning data from at least one of the mobile device and the vehicle;
means for shifting, at the mobile device, the relative path including the initial heading to the estimated path, the shifted initial heading indicating the actual heading of the vehicle; and
means for performing, at the mobile device, dead reckoning based on the actual heading of the vehicle and based on a lever arm value representing a difference in location of the mobile device and an odometry device on the vehicle.

* * * * *